United States Patent

O'Neal

[15] 3,700,826

[45] Oct. 24, 1972

[54] MULTI-TRACK ADAPTER CARTRIDGE ADAPTER UNIT FOR A MULTI-TRACK CARTRIDGE TYPE MAGNETIC TAPE PLAYER

[72] Inventor: Donald V. O'Neal, 2459 Rhodes, River Grove, Ill. 60171

[22] Filed: Jan. 17, 1972

[21] Appl. No.: 218,499

Related U.S. Application Data

[63] Continuation of Ser. No. 883,224, Dec. 8, 1969, abandoned.

[52] U.S. Cl. ........................179/100.2 Z, 179/100.11

[51] Int. Cl. ..............................................G11b 31/00

[58] Field of Search...179/100.11, 100.2 Z, 1 C, 2 C; 325/311

[56] References Cited

UNITED STATES PATENTS 3,582,965 6/1971 De Metrick ..........179/100.11

3,482,060 12/1969 Dermond.........179/100.2 CA 1,854,219 4/1932 Owens..................179/100.11

FOREIGN PATENTS OR APPLICATIONS 446,750 11/1967 Switzerland..........179/100.11

*Primary Examiner*—Bernard Konick

*Assistant Examiner*—Raymond F. Cardillo, Jr.

*Attorney*—Mueller & Aichele

[57] ABSTRACT

A transducer mounted within a cartridge housing is positioned so as to be urged against the playback head of the tape player. One or more terminals are provided at the other end of the cartridge housing for easy connection to other signal producing means such as cassette tape recorders, transistor radios, or the like.

4 Claims, 2 Drawing Figures

PATENTED OCT 24 1972

3,700,826

Inventor
DONALD V. O'NEAL
BY Mueller, Aichele & Rauner
ATTYS.

MULTI-TRACK ADAPTER CARTRIDGE ADAPTER UNIT FOR A MULTI-TRACK CARTRIDGE TYPE MAGNETIC TAPE PLAYER

This is a continuation, of application Ser. No. 883,224, filed Dec. 8, 1969 and now abandoned.

BACKGROUND OF THE INVENTION

The invention relates generally to an adapter unit for magnetic tape recorders, and more particularly to an adapter unit to be plugged into a cartridge type multi-track tape player.

Multi-track tape players, such as eight track tape players, have become very popular for use in automobiles and homes as a means of enjoying music on prerecorded tapes. These tape players provide a relatively high degree of sound fidelity to afford the user thereof many pleasurable hours of music listening. In addition, they are becoming increasingly popular because, among other things, of the ease in which tape cartridges can be inserted therein for the reproduction of the music on the tape within the cartridge, thus eliminating a lot of time consuming manipulation by the user. Because of the high fidelity of such tape players and because of the ease with which a cartridge can be inserted therein it is a desirable feature to use the electronic circuitry within the multi-track tape player to reproduce electrical signals other than those already pre-recorded on a multi-track tape cartridge.

SUMMARY OF THE INVENTION

It is therefore an object of this invention to provide an adapter unit in the form of a cartridge housing, which can readily fit within a multi-track cartridge type, tape player so that electrical signals from other signal producing apparatus can be translated through the output circuitry of the tape player.

Another object of this invention is to provide an adapter unit which readily fits existing cartridge type tape players without the need of extra mechanical devices.

Briefly, the adapter unit takes the form of a conventional cartridge housing but with all of the tape transporting structure within the housing removed therefrom. The substantially hollow housing is then provided with a transducer mounted at one end thereof to be resiliently urged against the playback head of the multi-track tape player when the adapter cartridge housing is inserted into the tape player in the normal fashion. The transducer mounted within the housing has electrical leads connected thereto with the other end of the leads connected with one or more terminal connecting means located at the other end of the housing for connection to most any type of signal producing device. Preferably, several different types of jacks and/or plugs may be provided at the exposed end of the cartridge housing to receive plugs of different sizes and shapes, and leads with plugs connected at their ends may be provided for insertion into signal producing devices which have female plug connections at their output.

DESCRIPTION OF THE PREFERRED EMBODIMENT

Figure 1:
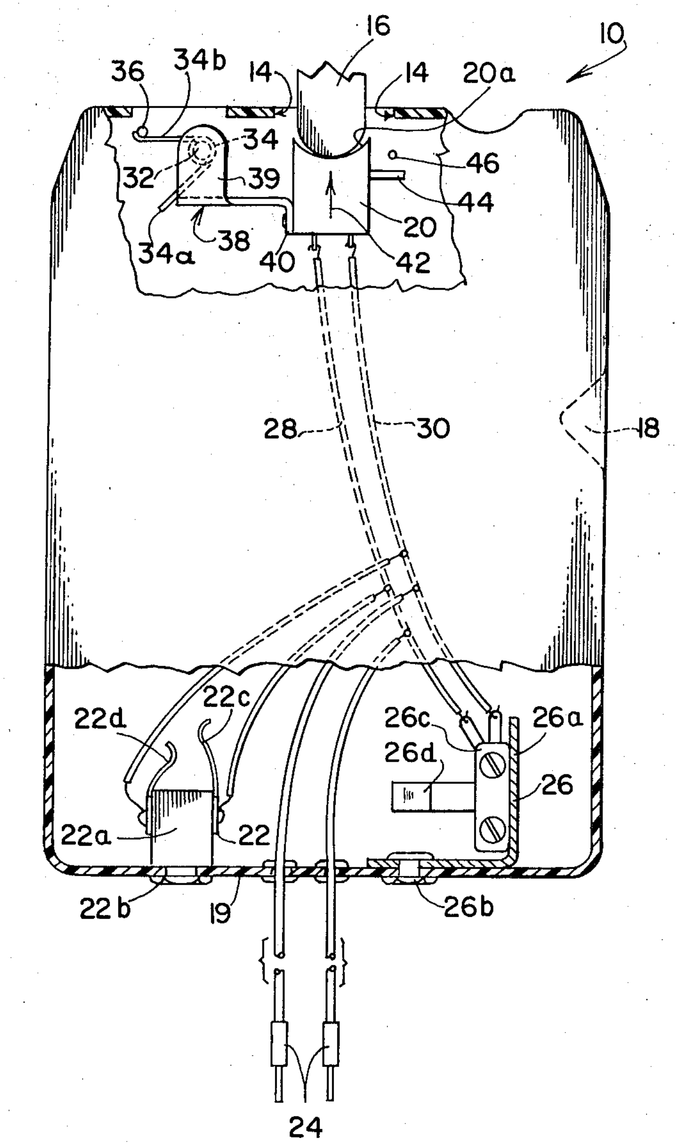
FIG. 1 is a plan view of the cartridge type adapter unit of this invention.
Figure 2:
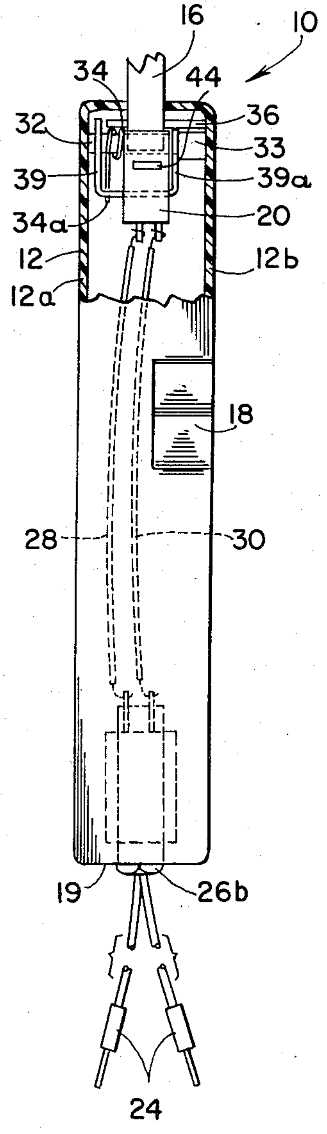
FIG. 2 is a side view of the adapter of FIG. 1 with portions thereof broken away.

Referring now to the drawings, FIGS. 1 and 2 illustrate an adapter unit constructed in accordance with this invention and is designated generally by reference numeral 10. The adapter unit 10 comprises a housing 12, preferably of conventional configuration similar to that of a tape cartridge housing, to be inserted into a cartridge type multi-track tape player. The housing 12 has a pair of spaced-apart confronting walls 12*a* and 12b, and the space within the housing is free of tape or other tape transporting members. An opening 14 is formed at the end of the housing 12 which is to be inserted into the tape player so that a magnetic playback head 16 of the tape player, details of which are not shown, fits through the opening 14 in the conventional manner. The cartridge housing 12 has a retainer detent 18 formed in one side thereof to engage with suitable means within the tape player, as is well known in the art, to hold the cartridge housing firmly but removably in the tape player.

Most advantageously, a transducer 20 is resiliently mounted within the housing 12 to be urged against the playback head 16 when inserted into the tape player. The transducer 20 has a magnetic field inducing front surface 20*a* which abutts with the playback head 16 in a manner to induce the same magnetic signals either into both pickups of the head 16, in the case of a stereo head, or to induce magnetic signals into one or the other of the pickups. Also, the transducer 20 may be a dual device to provide stereo input to the playback head 16. The transducer 20 preferably is connected to a plurality of terminals or connector means 22, 24 and 26 by a pair of leads 28 and 30. The different kinds of terminals, as well as the selection of plug configurations, provide means for connecting a plurality of different kinds of plug-in connectors to the adapter 10 as well as providing means for plugging the adapter 10 into plug-in connectors such as those provided on cassette type tape recorders, this being accomplished by the plugs 24.

The female jack 22 has a body portion 22*a* firmly held in position against a back wall 19 by means of a threaded nut 22b. A pair of resilient contactors 22*c* and 22*d* extended rearwardly of the body portion 22*a* and are in space relation with one another to engage different portions of a standard phono plug of the appropriate size. On the other hand, the female jack 26 includes a metal bracket 26*a* having one portion thereof secured to the wall 19 by a nut 26*b* and another portion extending rearwardly of the wall 19 to support suitable insulating means 26*c* which, in turn, hold a resilient contactor 26*d*. The different types of female jacks 22 and 26 are shown merely as an example and not as a limitation. The jacks used at the wall 19 may take any suitable configuration and size as desired.

Preferably, a post 32 extends from a standoff 33 secured to or formed on the wall 12*b*, of the housing 12, the post 32 preferably extending to the wall 12*a*. A torsion spring 34 is mounted on the post 32 and has an arm portion 34*a* thereof engaged with a movable support arm 38, and another arm portion 34*b* of the torsion spring 34 is engaged with a stop member 36. The support arm 38 has bent over extended portions 39 and 39*a* apertured to receive the post 32. Formed at the other end of support arm 38 is a transducer receiving portion 40 for securely holding the transducer 20 such as by screws, adhesive, or the like. The torsion spring 34 urges the transducer head 20 in an arcuate direction, as indicated by the arrowed line 42, about the pivot point formed by the post 32.

A tablike extension 44 may be provided on the transducer 20 to extend therefrom a sufficient distance to engage a stop post 46 slightly displaced from the tab 44. When the adapter unit 10 is removed from the tape player the torsion spring 34 will urge the transducer head in the direction of the arrowed line 42 and the tab 44 and post 46 will limit this arcuate movement of the transducer 20. Therefore, when the adapter unit 10 is inserted into the tape player the playback head 16 will be in position to engage the transducer 20, as illustrated in FIG. 1.

Accordingly, the adapter unit disclosed herein provides means readily to adapt other signal producing devices into a multi-track tape player for reproduction of such signals.

I claim:

1. An adapter unit for playing remotely located electronic apparatus through a multi-track cartridge type magnetic tape player which includes a playback head, comprising: a cartridge housing to be inserted into a cartridge receiving portion of a magnetic tape player, a playback-head-receiving opening formed in the side wall of said cartridge housing at the end to be inserted into the tape player, a transducer, means mounting said transducer in said cartridge for positioning the same against the playback head of the tape player, said transducer mounting means including support means receiving said transducer, said support means being movably mounted in said cartridge housing, and spring means resiliently biasing said support means to position said transducer in a spaced relation to said playback-head-receiving opening formed in the side wall of said cartridge housing, with said cartridge housing being inserted into the tape player said playback head enters said cartridge housing through said head receiving opening thereof and engages said transducer and moves the same along with said support means against the bias of said spring means whereby said spring means maintains said transducer in registry with said playback head for inducing electromagnetic signals therethrough which are reproduced by the tape player, and external connector means electrically connected to said transducer and accessible from the end of said cartridge housing extending from said tape player for connection to remotely located electronic apparatus to receive the output signal therefrom, said external connecting means coupling said output signals through the adapter unit to said transducer means for coupling the signals into the playback head of the tape player.

2. The adapter unit of claim 1 wherein; said external connecting means includes a plurality of connectors of different configurations readily to adapt said cartridge housing for receiving different kinds of male connectors and further including plug-in connectors extending from said cartridge housing by electrical leads for insertion into a cassette magnetic tape recorder.

3. The adapter unit of claim 1 wherein said transducer mouting means includes a post formed within the said cartridge housing extending between the walls thereof in closest spaced relation to one another, a support arm pivotally connected to said post and extending therefrom; means formed at the extended end of said support arm for receiving and holding said transducer in substantial registry with said playback-head-receiving opening; and spring means having a helical body portion positioned about said post and extended end portions, one end portion being urged against said support arm and the other end portion engaging stop means pivotally and resiliently to urge said transducer in an arcuate direction pivoting about said post towards said playback-head-receiving opening through which the playback head of the tape player is to extend.

4. The adapter unit of claim 1 wherein said transducer is arcuately shaped at the mating surface thereof which is to be engaged with the playback head of the tape player.

* * * * *